(12) United States Patent
Umehara et al.

(10) Patent No.: US 10,106,012 B2
(45) Date of Patent: Oct. 23, 2018

(54) AIR-CONDITIONER FOR VEHICLE

(71) Applicant: DENSO CORPORATION, Kariya, Aichi-pref. (JP)

(72) Inventors: Akira Umehara, Kariya (JP); Shinsaku Isomura, Kariya (JP); Keita Honda, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 133 days.

(21) Appl. No.: 15/113,847

(22) PCT Filed: Mar. 26, 2015

(86) PCT No.: PCT/JP2015/001757
§ 371 (c)(1),
(2) Date: Jul. 25, 2016

(87) PCT Pub. No.: WO2015/162855
PCT Pub. Date: Oct. 29, 2015

(65) Prior Publication Data
US 2017/0036514 A1 Feb. 9, 2017

(30) Foreign Application Priority Data

Apr. 24, 2014 (JP) .................. 2014-090440

(51) Int. Cl.
*B60H 1/03* (2006.01)
*H01M 8/04* (2016.01)
(Continued)

(52) U.S. Cl.
CPC ......... *B60H 1/034* (2013.01); *B60H 1/00278* (2013.01); *B60H 1/00385* (2013.01);
(Continued)

(58) Field of Classification Search
CPC ............ B60H 1/00278; B60H 1/00385; B60H 1/00392
See application file for complete search history.

(56) References Cited

U.S. PATENT DOCUMENTS

2002/0184908 A1* 12/2002 Brotz ................. B60H 1/00 62/259.2
2012/0324934 A1* 12/2012 Sakai ................. B60H 1/00385 62/236

FOREIGN PATENT DOCUMENTS

JP 2010268639 A 11/2010
JP 2012195263 A 10/2012

* cited by examiner

*Primary Examiner* — Matthew J Merkling
(74) *Attorney, Agent, or Firm* — Harness, Dickey & Pierce, P.L.C.

(57) ABSTRACT

An air-conditioner for a vehicle includes: a first circuit in which a cooling medium circulates; a heater heating the cooling medium; a first pump disposed in the first circuit; a second circuit cooling a heat emitting portion; a second pump disposed in the second circuit; an adjustment portion controlling a circulation amount of the cooling medium flowing in the first circuit and a circulation amount of the cooling medium flowing in the second circuit; and a control portion. The vehicle includes a regenerative device, and a storage device is charged with electric energy recovered by the regenerative device. When the regenerative device is recovering the electric energy and when it is determined that power in the storage device needs to be consumed, the control portion drives the heater to heat the cooling medium such that the power in the storage device is converted into heat energy.

4 Claims, 4 Drawing Sheets

(51) Int. Cl.
  *H01M 8/24* (2016.01)
  *B60L 1/04* (2006.01)
  *B60W 10/30* (2006.01)
  *B60W 20/00* (2016.01)
  *B60H 1/00* (2006.01)
  *B60H 1/22* (2006.01)
  *B60L 1/02* (2006.01)
  *H01M 8/04014* (2016.01)
  *H01M 8/04029* (2016.01)
  *H01M 8/04007* (2016.01)
  *H01M 8/241* (2016.01)

(52) U.S. Cl.
  CPC ..... *B60H 1/00428* (2013.01); *B60H 1/00885* (2013.01); *B60H 1/2221* (2013.01); *B60L 1/02* (2013.01); *B60L 1/04* (2013.01); *B60W 10/30* (2013.01); *B60W 20/00* (2013.01); *H01M 8/04* (2013.01); *H01M 8/04014* (2013.01); *H01M 8/04029* (2013.01); *H01M 8/04074* (2013.01); *H01M 8/241* (2013.01); *B60H 2001/224* (2013.01); *B60H 2001/2253* (2013.01); *B60H 2001/2265* (2013.01); *H01M 2250/20* (2013.01); *Y02T 10/88* (2013.01); *Y02T 90/32* (2013.01)

AIR-CONDITIONER FOR VEHICLE

CROSS REFERENCE TO RELATED APPLICATIONS

This application is a U.S. National Phase Application under 35 U.S.C. 371 of International Application No. PCT/JP2015/001757 filed on Mar. 26, 2015 and published in Japanese as WO 2015/162855 A1 on Oct. 29, 2015. This application is based on and claims the benefit of priority from Japanese Patent Application No. 2014-90440 filed on Apr. 24, 2014. The entire disclosures of all of the above applications are incorporated herein by reference.

TECHNICAL FIELD

The present disclosure relates to an air-conditioner for a vehicle, which air-conditions using energy recovered by a regenerative brake.

BACKGROUND ART

A social demand for fuel-efficient vehicles in recent years spreads the use of a regenerative brake which generates power by driving a motor using motive power during deceleration of a vehicle, that is, a turning force of wheels, and charges generated power into a battery. The regenerative brake recovers energy by converting kinetic energy during deceleration of the vehicle into power which is stored into the battery.

In a case where power is recovered and stored into the battery by the regenerative brake as above, a recovery amount of generated power may be increased above allowable power of the battery. Thus, in order to prevent an excessive supply of power to the battery, a vehicular control device described in Patent Literature 1 consumes power by deliberately driving an electric compressor provided for air conditioning and other high-voltage auxiliary machines.

PRIOR ART LITERATURES

Patent Literature

Patent Literature 1: JP 2010-268639 A

SUMMARY OF INVENTION

In the case of the control device as above, when the battery is charged by the regenerative brake over a considerable time like on a long downhill run, an increase in battery charging power may not be prevented even by driving the high-voltage auxiliary machines. In such a case, the regenerative brake has to be turned off and switched to a hydraulic brake, which gives rise to wear of the brake and deterioration of a travel feeling at switching of braking systems.

An object of the present disclosure is to provide an air-conditioner for a vehicle in which energy recovered by a regenerative brake is capable of not only being charged into a battery but also capable of being used to condition air in a vehicle interior.

According to an aspect of the present disclosure, an air-conditioner for a vehicle configured to blow air-conditioning air into an interior of the vehicle includes: a first circuit in which a cooling medium circulates to cool a drive source of the vehicle; a heater heating the cooling medium circulating in the first circuit by consuming power in a storage device installed to the vehicle; a heating heat-exchanger disposed in the first circuit and heating the air-conditioning air passing through the heating heat-exchanger using the cooling medium by exchanging heat with the air-conditioning air passing through the heating heat-exchanger; a first pump disposed in the first circuit and forcing the cooling medium to circulate in the first circuit; a second circuit cooling a heat emitting portion installed to the vehicle, the cooling medium circulating in the first circuit is allowed to circulate in the second circuit; a second pump disposed in the second circuit and forcing the cooling medium to circulate in the second circuit; an adjustment portion connecting the first circuit and the second circuit and controlling a circulation amount of the cooling medium flowing in the first circuit and a circulation amount of the cooling medium flowing in the second circuit; and a control portion controlling the heater, the adjustment portion, the first pump, and the second pump. The vehicle includes a regenerative device recovering energy by converting kinetic energy to electric energy during deceleration of the vehicle, and the storage device is charged with the electric energy recovered by the regenerative device. When the regenerative device is recovering the electric energy under a consumption required state in which it is determined that power in the storage device needs to be consumed by the air-conditioner, the control portion controls the heater, the adjustment portion, the first pump, and the second pump to heat the cooling medium by driving the heater such that the power in the storage device is converted into heat energy.

The air-conditioner includes the heater heating the cooling medium circulating in the first circuit by consuming power in the storage device installed to the vehicle. When the regenerative device is recovering electric energy and when it is necessary to consume power in the power storage device by the air-conditioner, the control portion heats the cooling medium by driving the heater and controls the heater, the adjustment portion, the first pump, and the second pump to convert power in the storage device into heat energy.

According to the configuration as above, the air-conditioner performs a special control when the regenerative device is recovering electric energy under a consumption required state in which it is determined that power in the storage device needs to be consumed by the air-conditioner. Electric energy recovered by the regenerative device is consumed by a power consuming device of the vehicle and also charged into the storage device. However, when power consumption by the power consuming device is small and when the storage device has a power storage limit, electric energy recovered by the regenerative device may not be consumed and wasted. In order to prevent such a waste, the air-conditioner performs a special control to convert the recovered electric energy into heat energy.

More specifically, the control portion heats the cooling medium by driving the heater and controls the heater, the adjustment portion, the first pump, and the second pump to convert power in the storage device into heat energy. When the heater is driven, electric energy is consumed and is thereby converted into heat energy. Also, by controlling the first pump, the second pump, and the adjustment portion, circulation amounts of the cooling medium circulating in the first circuit and the second circuit can be controlled. Hence, the heater can be driven according to a temperature of the cooling medium and a heating value necessary for air conditioning. Accordingly, energy recovered by the regenerative device can be charged into the storage device and also used to condition air in the vehicle interior. Hence, a possibility of turning off the regenerative device can be lowered. Consequently, energy recovered by the regenerative device can be used efficiently.

DESCRIPTION OF EMBODIMENTS

Embodiment

Figure 1:
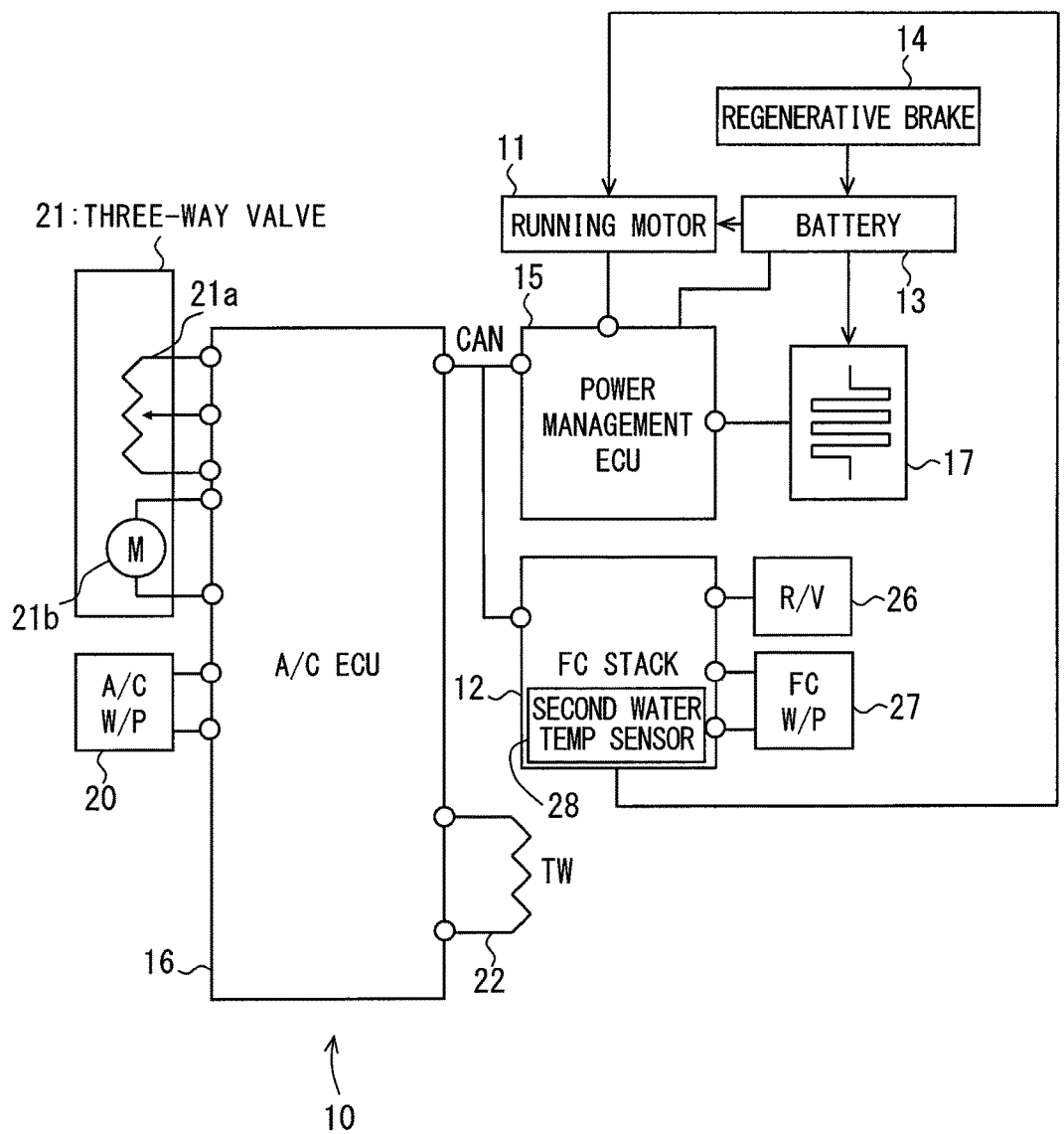
FIG. 1 is a block diagram showing an electrical configuration of a system including an air-conditioner for a vehicle according to an embodiment.

An embodiment will be described using FIG. 1 through FIG. 5. An air-conditioner 10 for a vehicle blows air-conditioning air to condition air in the vehicle. As is shown in FIG. 1, the air-conditioner 10 is installed to a fuel-cell hybrid vehicle (FCHV) including a running motor 11 as a running drive source and fuel cells (FC stack) 12 as a power supply portion for the running motor 11. Hence, the running motor 11 is driven with a supply of power from both of the FC stack 12 and an in-vehicle battery 13.

A regenerative brake 14 as a regenerative device is electrically connected to the battery 13. The regenerative brake 14 recovers energy by converting kinetic energy into electric energy during deceleration of the vehicle. The regenerative brake 14 charges recovered electric energy into the battery 13 which is a storage device.

The FC stack 12 has multiple fuel cells each generating power through an electrochemical reaction between hydrogen and oxygen. The FC stack 12 can be solid polymer fuel cells. It should be appreciated, however, that the FC stack 12 is not limited to solid polymer fuel cells, and phosphoric acid fuel cells, molten carbonate fuel cells, and the like are also available.

As is shown in FIG. 1, a power management ECU 15 (hereinafter, occasionally abbreviated to P/M ECU 15) controls the running motor 11. The P/M ECU 15 also exchanges necessary information with the FC stack 12 and an air-conditioning ECU 16 of the air-conditioner 10 via CAN (Controller Area Network (registered trademark)) communication. The P/M ECU 15 determines an amount of power to be supplied to the running motor 11 on the basis of an amount of power generation in the FC stack 12, a remaining amount of the battery 13, a running state of the vehicle, and so on. The P/M ECU 15 controls the running motor 11 to be driven with the determined amount of power.

Figure 2:
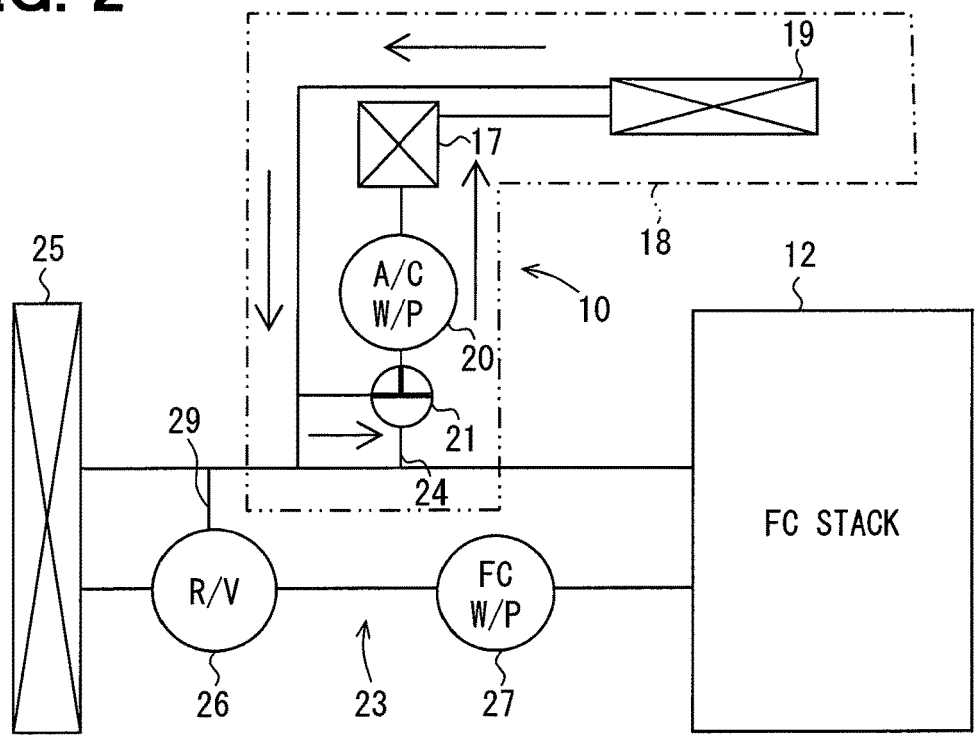
FIG. 2 is a view showing an air-conditioning hot-water circuit of the air-conditioner.

The air-conditioner 10 has a system, as is shown in FIG. 2, equipped with a high-voltage water heating heater (hereinafter, referred to also simply as the heater) 17, which heats water in an air-conditioning hot-water circuit 18 to release heat at a heater core 19. The air-conditioning hot-water circuit 18 is a first circuit in which water is circulated to cool the running motor 11 as a drive source of the vehicle.

The air-conditioning hot-water circuit 18 forms a circulation channel for hot water (water) as a cooling medium to circulate. The air-conditioning hot-water circuit 18 has an electric air-conditioning pump 20 forcing water to circulate in the air-conditioning hot-water circuit 18, the heater 17 heating water, a first temperature sensor 22 detecting a temperature of circulating hot water, and the heater core 19. Hence, the heater 17 is used as a heat source when air-conditioning air is provided by heating air to be blown into the vehicle interior. The heater core 19 is configured in such a manner that hot water heated by the heater 17 flows through the heater core 19.

The first temperature sensor 22 detects a temperature of water circulating in the air-conditioning hot-water circuit 18. The first temperature sensor 22 detects a temperature of hot water after flowing out from the heater 17 and before flowing into the heater core 19. The first temperature sensor 22 provides detected temperature information to the air-conditioning ECU 16. The first temperature sensor 22 can be realized by, for example, an in-line temperature thermistor.

DC power obtained from the in-vehicle battery 13 is supplied to the heater 17 while duty is separately controlled by, for example, an inverter portion. While power is supplied, the heater 17 consumes a constant amount of power. The heater 17 can be realized by, for example, a sheathed heater using a nichrome wire.

The heater core 19 is a heater heating portion (heating heat-exchanger) heating air-conditioning air flowing inside an air-conditioning case by using cooling water as a heating source. The heater core 19 is disposed in the air-conditioning case on a downstream side in a flow of the air-conditioning air. A cooling water channel is provided inside the heater core 19. Hence, when the cooling water flows the cooling water channel, the heater core 19 heats the air-conditioning air passing through the heater core 19 itself by releasing heat of the cooling water to the air-conditioning air.

A cooling circuit 23 cooling the FC stack 12 is connected to the air-conditioning hot-water circuit 18. More specifically, the cooling circuit 23 is connected to the air-conditioning hot-water circuit 18 with two connection passages 24 to allow water circulating in the air-conditioning hot-water circuit 18 to also circulate in the cooling circuit 23. A three-way valve 21 is provided to one of the connection passages.

Figure 3:
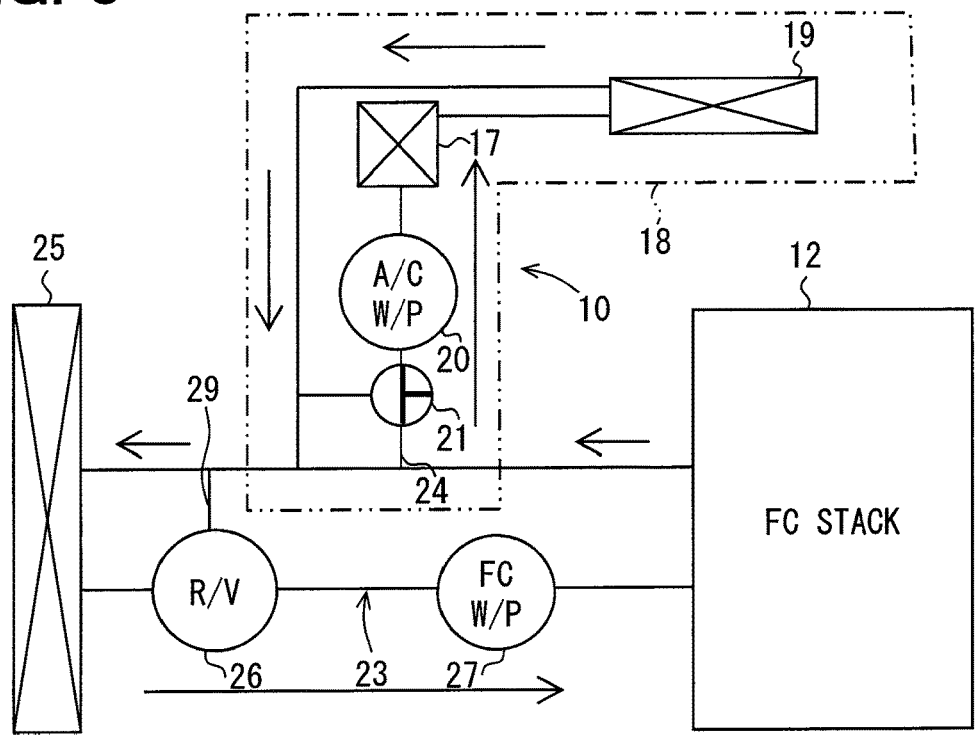
FIG. 3 is a view showing a state in which the air-conditioning hot-water circuit and a cooling circuit are connected to each other.

By opening and closing, the three-way valve 21 connects the cooling circuit 23 and the air-conditioning hot-water circuit 18 as shown in FIG. 3 (cooperation) and separates the cooling circuit 23 from the air-conditioning hot-water circuit 18 as shown in FIG. 2 (operate independently). In other words, the three-way valve 21 switches a channel of the cooling water circulating in the air-conditioning hot-water circuit 18 to a state shown in FIG. 2 in which the cooling water circulates in the air-conditioning hot-water circuit 18 alone or a state shown in FIG. 3 in which the cooling water also circulates in the cooling circuit 23 according to displacement of a valve body. The three-way valve 21 can be realized by, for example, a servo motor 21*b* using a potentiometer. The servo motor 21*b* causes the three-way valve 21 to change a position of the valve body. A potentiometer 21*a* detects a position of the valve body. The servo motor 21*b* is driven to dispose the valve body at a predetermined position on the basis of the position of the valve body detected by the potentiometer 21*a*. Hence, the three-way valve 21 functions as an adjustment portion which regulates a circulation amount of water flowing in the air-conditioning hot-water circuit 18 and a circulation amount of water flowing in the cooling circuit 23.

The air-conditioning pump 20 is a first pump and disposed in the air-conditioning hot-water circuit 18 at a position downstream of the three-way valve 21 and upstream of the heater 17. The air-conditioning pump 20 is a circulation pump forcing the cooling water to circulate in the air-conditioning hot-water circuit 18. The air-conditioning pump 20 can be, for example, a pump device configured to rotate an impeller inside a pump housing.

The air-conditioning (A/C) ECU 16 is a control portion including a microcomputer and peripheral circuits. The air-conditioning ECU 16 performs computation processing in accordance with a pre-set program using various temperature signals from the first temperature sensor 22, an outside air temperature sensor, and an inside air temperature sensor, as well as a solar radiation signal from a solar radiation sensor, a pre-set temperature signal set by an occupant via an unillustrated operation panel, and so on. Also, the air-conditioning ECU 16 controls the three-way valve 21, the air-conditioning pump 20, an air blower (not shown), an air-mixing door (not shown), and so on according to a computation result. Further, the air-conditioning ECU 16 controls an operation of the heater 17 by way of the P/M ECU 15 in response to a heating request by communicating with the P/M ECU 15 via CAN communication.

The cooling circuit 23 will now be described. The fuel-cell hybrid vehicle has the cooling circuit 23 cooling the FC stack 12 as shown in FIG. 2. The cooling circuit 23 is a circuit forcing the cooling water (corresponding to the cooling medium) to circulate outside the FC stack 12 by flowing out from the FC stack 12 and returning to the FC stack 12. The cooling circuit 23 connects a cooling water outlet and a cooling water inlet of the FC stack 12. The cooling circuit 23 and the air-conditioning hot-water circuit 18 are connected via the connection passages 24 to allow water circulating in the air-conditioning hot-water circuit 18 to also circulate in the cooling circuit 23. The cooling circuit 23 is provided with a radiator 25, a rotary valve 26, and a fuel-cell pump 27. A second temperature sensor 28 detecting a temperature of the cooling water in the cooling circuit 23 is provided inside the FC stack 12.

The FC stack 12 supplies power necessary for the vehicle to run. A heating value generated by the FC stack 12 during power generation is substantially as large as a heating value generated by an internal combustion engine. Hence, even a passenger vehicle is equipped with the radiator 25 as large as a radiator used for a truck as a radiation heat-exchanger. The radiator 25 is disposed in the cooling circuit 23 and releases heat of the cooling water to the outside by exchanging heat with outside air. Hence, the radiator 25 is a radiation heat-exchanger cooling the cooling water that becomes hot in the FC stack 12. The radiator 25 is disposed inside an engine room, for example, in a front part behind a grill. The radiator 25 is provided with an unillustrated blowing fan. The radiator 25 cools the cooling water with cooling air supplied by the blowing fan.

The cooling circuit 23 has a bypass passage 29 to allow the cooling water to flow by bypassing the radiator 25. That is to say, the bypass passage 29 is provided so as to branch from the cooling circuit 23 at a branch point upstream of the radiator 25 in a flow of the cooling water and to merge with the cooling circuit 23 at a merge point downstream of the radiator 25 in the flow of the cooling water.

The rotary valve 26 is a valve device provided at the branch point at which the bypass passage 29 branches from the cooling circuit 23 to regulate a flow ratio between the cooling water passing through the radiator 25 and the cooling water passing through the bypass passage 29. The rotary valve 26 uses an internal valve and switches opening and closing states between a case where water is allowed to flow through the radiator 25 by opening a side on the radiator 25 and closing a side on the bypass passage 29 and a case where water is allowed to flow through the bypass passage 29 by opening the side on the bypass passage 29 and closing the side on the radiator 25.

The fuel-cell pump 27 is a second pump and disposed in the cooling circuit 23 at a position downstream of the merge point at which the bypass passage 29 merges with the cooling circuit 23 in the flow of the cooling water. That is to say, the fuel-cell pump 27 is located downstream of the merge point of the bypass passage 29 to the cooling circuit 23 and upstream of the FC stack 12. The fuel-cell pump 27 is a circulation pump forcing the cooling water to circulate in the cooling circuit 23. The fuel-cell pump 27 can be, for example, a pump device configured to rotate an impeller inside a pump housing.

The FC stack 12 includes a fuel-cell ECU (not shown). The fuel-cell ECU is a control portion controlling the FC stack 12. The fuel-cell ECU receives inputs of information on a heating value of the fuel cells outputted from the FC stack 12 or a physical amount (for example, an amount of power generation) relating to the heating value and temperature information outputted from the second temperature sensor 28. The fuel-cell ECU controls operations of the rotary valve 26 and the fuel-cell pump 27 according to the input information specified as above.

Figure 4:
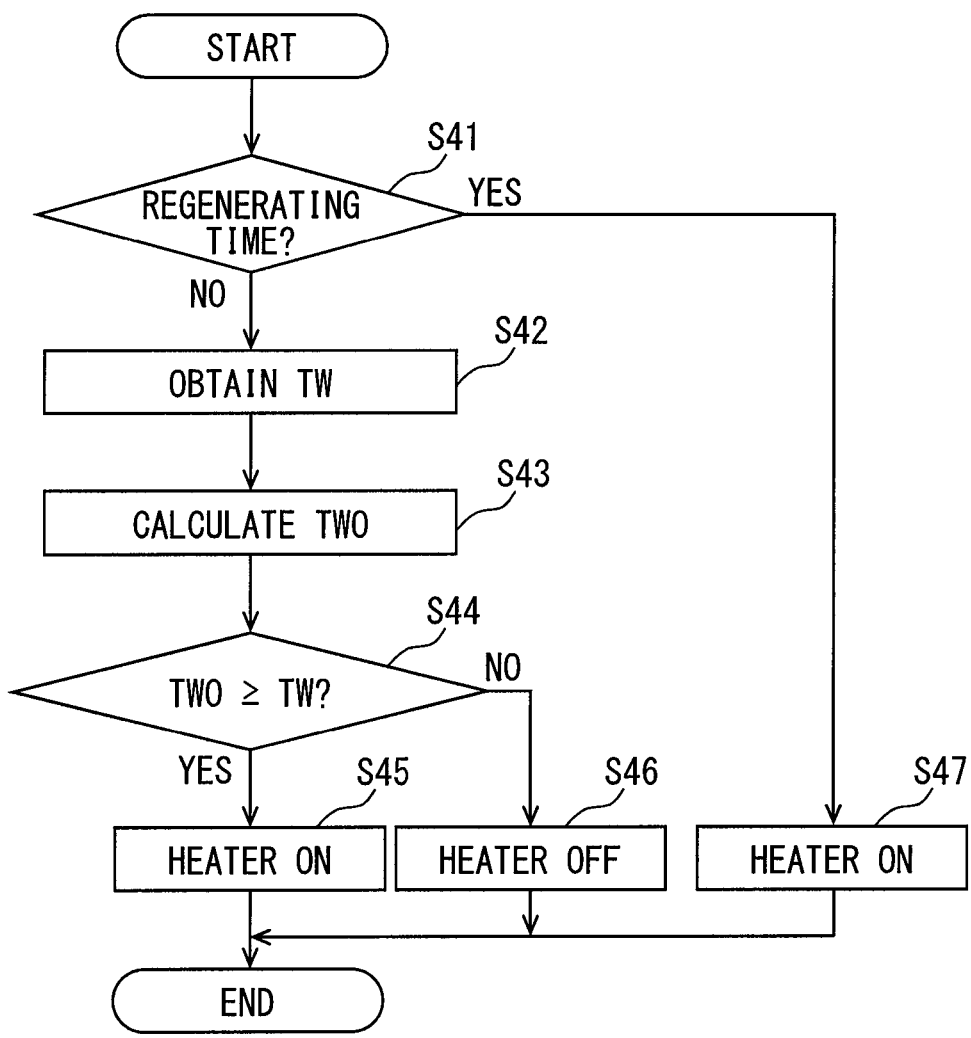
FIG. 4 is a flowchart showing a control on a heater by a power management ECU.

A control on the heater 17 will now be described using FIG. 4. In actual operations, the air-conditioning ECU 16 indirectly controls the heater 17 by way of the P/M ECU 15. The P/M ECU 15 repetitively performs a control shown in FIG. 4 when an ignition of the vehicle is ON.

In Step S41, it is determined whether power is regenerated by the regenerative brake 14. When power is regenerated, advancement is made to Step S47. When power is not regenerated, advancement is made to Step S42.

In Step S42, because power is not regenerated, an air-conditioning water temperature TW is obtained from the first temperature sensor 22, and advancement is made to Step S43. In Step S43, a target water temperature TWO of the air-conditioning hot-water circuit 18 is calculated on the basis of a vehicle heat load and a pre-set indoor temperature obtained from the various sensors, and advancement is made to Step S44. The vehicle heat load is calculated using an outside air temperature, an inside air temperature, an amount of solar radiation, and a pre-set indoor temperature, and so on.

In Step S44, the target water temperature TWO and the air-conditioning water temperature TW are compared. When the target water temperature TWO is higher than or equal to the air-conditioning water temperature TW, advancement is made to Step S45. When the target water temperature TWO is lower than the air-conditioning water temperature TW, advancement is made to Step S46.

In Step S45, because the target water temperature TWO is higher than the air-conditioning water temperature TW, water in the air-conditioning hot-water circuit 18 needs heating. Accordingly, the heater 17 is driven (turned ON) under control and the flow is ended.

In Step S46, because the target water temperature TWO is below the air-conditioning water temperature TW, water in the air-conditioning hot-water circuit 18 does not need heating. Accordingly, the heater 17 is controlled to stop (turned OFF) under control and the flow is ended.

In Step S47, because power is regenerated by the regenerative brake 14, the heater 17 is driven (turned ON) under control to consume power and the flow is ended.

As has been described, in normal heating in which power is not regenerated by the regenerative brake 14, as are shown in Step S42 through Step S46, the target water temperature TWO is calculated on the basis of the vehicle heat load (Step S43), and the heater 17 is driven to turn ON or OFF according to a difference between the target water temperature TWO and the air-conditioning water temperature TW. The heater 17 has at least two drive levels (W) including an OFF level and the drive levels are realized by PID control. Also, the heater 17 is driven on a high voltage across the FC stack 12 or the battery 13, and a heating value of generated heat is released at the heater core 19 by way of a fluid in the air-conditioning hot-water circuit 18. Consequently, the vehicle interior can be heated at a desired temperature.

When power is regenerated, by turning the heater 17 ON using power generated by the regenerative brake 14, braking energy can be stored in the air-conditioning hot-water circuit 18 in the form of heat. Accordingly, in the case of heating during winter months, driving frequencies of the heater 17 by the FC stack 12 can be reduced. Hence, a power saving effect can be achieved.

Figure 5:
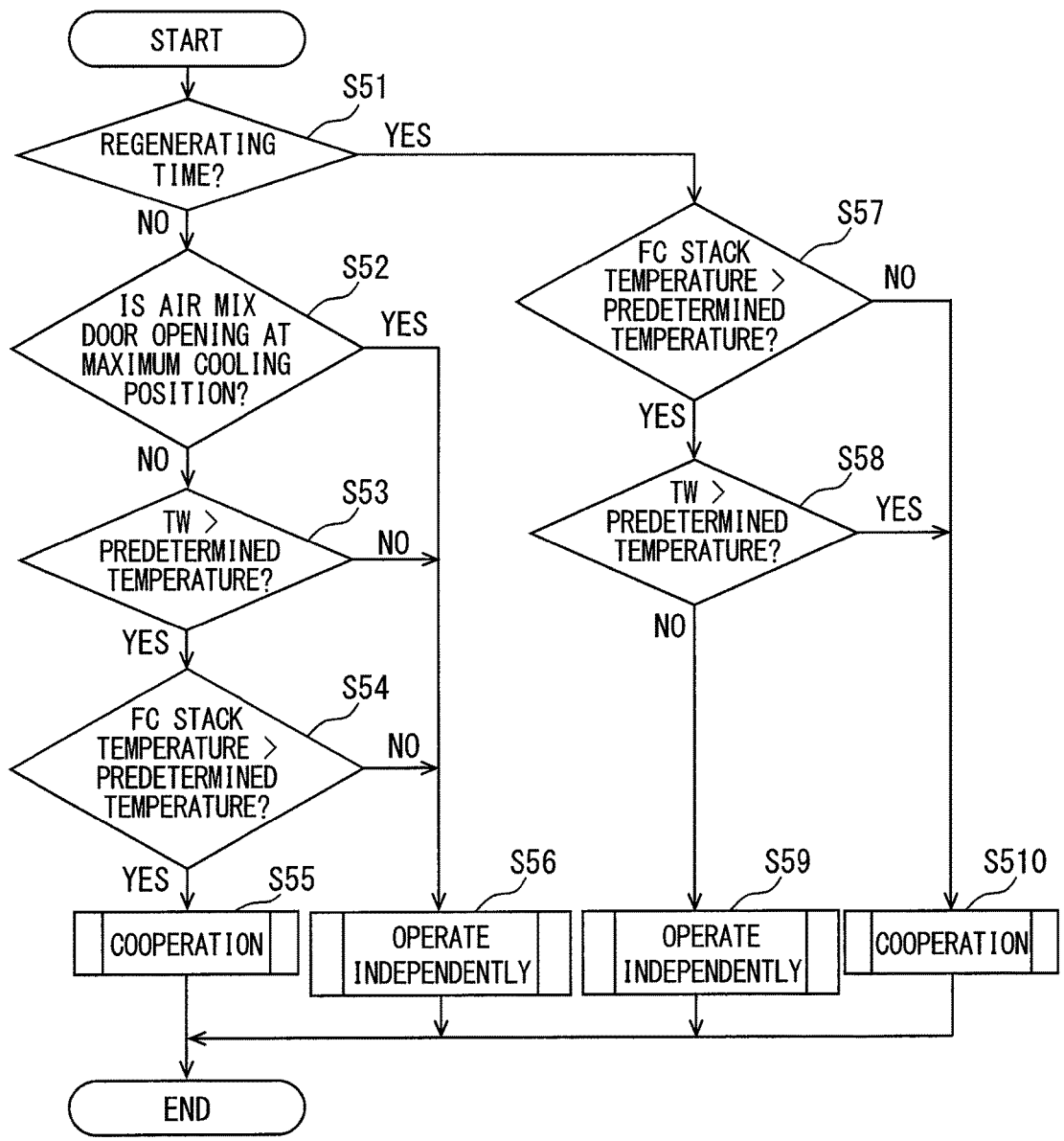
FIG. 5 is a flowchart showing a control on a three-way valve by an air-conditioning ECU.

A control on the three-way valve 21 will now be described using FIG. 5. The air-conditioning ECU 16 repetitively performs a control shown in FIG. 5 when the ignition of the vehicle is ON.

In Step S51, it is determined whether power is regenerated by the regenerative brake 14. When power is regenerated, advancement is made to Step S57. When power is not regenerated, advancement is made to Step S52.

In Step S52, it is determined whether the air-mixing door is fully opened to a maximum cooling position. When the air-mixing door is fully opened to the maximum cooling position (MAX COOL), advancement is made to Step S56. When the air-mixing door is not fully opened to the maximum cooling position, advancement is made to Step S53. The air-mixing door is a revolving door to regulate a volume of air-conditioning air passing near the heater core 19. A flow ratio of heating air flowing through the heater core 19 and cooling air bypassing the heater core 19 is regulated according to an opening degree of the air-mixing door. Consequently, a temperature of the air-conditioning air downstream of the heater core 19 is regulated. Hence, the maximum cooling position is an opening position of the air-mixing door at which cooling performance is fully exerted. In other words, when the air-mixing door is at the maximum cooling position, air does not need heating by the heater core 19.

In Step S53, because the air-mixing door is not at the maximum cooling position, it is determined whether the air-conditioning water temperature TW is higher than or equal to a predetermined temperature. When the air-conditioning water temperature TW is higher than or equal to the predetermined temperature, advancement is made to Step S54. When the air-conditioning water temperature TW is lower than the predetermined temperature, advancement is made to Step S56.

In Step S54, it is determined whether a temperature of the FC stack 12 is higher than or equal to a predetermined temperature. When the temperature of the FC stack 12 is higher than or equal to the predetermined temperature, advancement is made to Step S55. When the temperature of the FC stack 12 is lower than the predetermined temperature, advancement is made to Step S56.

In Step S55, because the air-mixing door is not at the maximum cooling position, air needs heating. Also, due to heating by the heater 17, the air-conditioning water temperature is higher than or equal to the predetermined temperature and the temperature of the FC stack 12 is higher than or equal to the predetermined temperature. Hence, as is shown in FIG. 3, the three-way valve 21 is controlled for the cooling circuit 23 and the air-conditioning hot-water circuit 18 to operate in cooperation. Consequently, heating performance is secured by using a heating value in the FC stack 12.

Advancement is made to Step S56 when the air-mixing door is at the maximum cooling position, when the air-conditioning water temperature TW is below the predetermined temperature, or when the temperature of the FC stack 12 is below the predetermined temperature. Hence, in Step S56, the three-way valve 21 is controlled for the air-conditioning hot-water circuit 18 to operate independently, thereby allowing water to circulate in the air-conditioning hot-water circuit 18 while preventing an inflow of water from the cooling circuit 23 (a circulation state shown in FIG. 2). Subsequently, the flow is ended.

When power is not regenerated as above, a heating value in the FC stack 12 is used effectively. Hence, when heating performance by the heater 17 alone is insufficient, the three-way valve 21 is opened to connect the air-conditioning hot-water circuit 18 and the cooling circuit 23 as is shown in FIG. 3. Accordingly, a heating value generated in the FC stack 12 can be provided to the air-conditioning hot-water circuit 18. When a heating value is sufficient, the three-way valve 21 is closed so as to let the air-conditioning hot-water circuit 18 function as a mechanism independent of the cooling circuit 23.

Processing when power is regenerated will now be described also using FIG. 5. In Step S57, because power is regenerated, it is determined whether the temperature of the FC stack 12 is higher than or equal to a predetermined temperature. When the temperature of the FC stack 12 is higher than or equal to the predetermined temperature, advancement is made to Step S58. When the temperature of the FC stack 12 is lower than the predetermined temperature, advancement is made to Step S510.

In Step S58, it is determined whether the air-conditioning water temperature TW is higher than or equal to a predetermined temperature. When the air-conditioning water temperature TW is higher than or equal to the predetermined temperature, advancement is made to Step S510. When the air-conditioning water temperature TW is lower than the predetermined temperature, advancement is made to Step S59.

In Step S59, because the temperature of the FC stack 12 is higher than or equal to the predetermined temperature and because the air-conditioning water temperature TW is lower than the predetermined temperature, the three-way valve is controlled for the air-conditioning hot-water circuit 18 to operate independently. Subsequently, the flow is ended. When power is regenerated, the FC stack 12 suspends power generation. However, in a case where the temperature of the FC stack 12 decreases in such circumstances, sufficient power generation and motive power cannot be secured when the FC stack 12 is resumed. To avoid such an inconvenience, when the air-conditioning water temperature TW is below the predetermined temperature, the air-conditioning hot-water circuit 18 is controlled to operate independently to prevent the temperature of the FC stack 12 from decreasing.

In Step S510, because the temperature of the FC stack 12 is lower than the predetermined temperature or because the air-conditioning water temperature TW is higher than or equal to the predetermined temperature, the three-way valve 21 is controlled as is shown in FIG. 3 for the air-conditioning hot-water circuit 18 and the cooling circuit 23 to operate in cooperation. Hence, heating performance is secured by using a heat value in the FC stack 12.

The FC stack 12 has to be maintained at an optimal temperature to achieve maximum power generation efficiency. When power is regenerated, the FC stack 12 does not generate power because no motive power is necessary and the stack temperature is low. However, when the regeneration of power ends, for example, at an end of a downhill, motive power becomes necessary. If the temperature of the FC stack 12 is low at that time, sufficient power generation cannot be secured. In order to avoid such an inconvenience, when the temperature of the FC stack 12 is low, a heating value in the heater 17 driven by power generated by the regenerative brake 14 is used by fixing the three-way valve 21 at a position to allow the air-conditioning hot-water circuit 18 and the cooling circuit 23 to operate in cooperation (Step S510). Consequently, heat can be stored also in the cooling circuit 23 and a sufficiently high power generation ability can be secured before a need for motive power arises at the end of a downhill.

When the temperature of the FC stack 12 is sufficiently high, the three-way valve 21 is fixed at a position to force the air-conditioning hot-water circuit 18 to operate independently (Step S59). Accordingly, heating can be performed by allowing the heater core 19 to use a heating value in the heater 17 driven by power generated by the regenerative brake 14. Hence, it is no longer necessary to generate power in the FC stack 12 and to supply power to the heater 17. An energy saving effect can be thus achieved.

When an independent mode continues during regeneration, the temperature of the air-conditioning water rises. In this case, resin components forming the air-conditioner 10 surrounding the air-conditioning hot-water circuit 18 may be exposed to a high temperature and undergo deformation. For example, in a case where the air-conditioning water temperature TW rises to 85° C. or above, it is preferable to store heat in all the circuits including the cooling circuit 23 by allowing the air-conditioning hot-water circuit 18 and the cooling circuit 23 to operate in cooperation even when the temperature of the FC stack 12 is high. When regeneration of power continues further, the temperature of the FC stack 12 also rises, and it is preferable to eventually release heat at the radiator 25 by opening the rotary valve 26. Consequently, the regenerative brake 14 is allowed to operate continuously over a long period.

As has been described above, the air-conditioner 10 of the present embodiment performs a special control when the regenerative brake 14 is recovering electric energy under a consumption required state in which it is determined that power in the battery 13 needs to be consumed by the air-conditioner 10. Electric energy recovered by the regenerative brake 14 is consumed in the form of power by a power consuming device of the vehicle and also charged into the battery 13. However, when power consumption by the power consuming device is small and when the battery 13 has a power storage limit, electric energy recovered by the regenerative brake 14 may not be consumed and wasted. In order to prevent such a waste, the air-conditioner 10 performs a special control to convert the recovered electric energy into heat energy.

More specifically, the control portion heats water by driving the heater 17 and controls the heater 17, the three-way valve 21, the air-conditioning pump 20, and the fuel-cell pump 27 to convert power in the battery 13 into heat energy. When the heater 17 is driven, electric energy is consumed and is thereby converted into heat energy. Also, by controlling the air-conditioning pump 20, the fuel-cell pump 27, and the three-way valve 21, circulation amounts of water circulating in the air-conditioning hot-water circuit 18 and the cooling circuit 23 can be controlled. Hence, the heater 17 can be driven according to a temperature of water and a heating value necessary for air conditioning. Accordingly, energy recovered by the regenerative brake 14 can be charged into the battery 13 and also used to condition air in the vehicle interior. Hence, a possibility of turning off the regenerative brake 14 can be lowered. Consequently, energy recovered by the regenerative energy 14 can be used efficiently.

In other words, in the present embodiment, the air-conditioner 10 includes the three-way valve 21 allowing the cooling circuit 23 to communicate with the air-conditioning hot-water circuit 18 in which the heater 17 is connected to the heater core 19. When regeneration is requested, the heater 17 is driven. Further, the three-way valve 21 is driven to a position to allow the air-conditioning hot-water circuit 18 to communicate with the cooling circuit 23. Hence, by using a cooperation configuration of the cooling circuit 23 of the FC stack 12 in the FCHV and the air-conditioning hot-water circuit 18, the regenerative brake 14 can be used over a long period on a long downhill. Also, power generated in the motor by the regenerative brake 14 can be used effectively in a portion where power is necessary.

In the present embodiment, when it is the power consumption required state, the air-conditioning ECU 16 heats water by driving the heater 17 and controls the three-way valve 21, the air-conditioning pump 20, and the fuel-cell pump 27 to allow water circulating in the air-conditioning hot-water circuit 18 to also circulate in the cooling circuit 23. Hence, heat generated at the heater 17 can be used as heat to be stored in the air-conditioning hot-water circuit 18 and the cooling circuit 23.

In the present embodiment, when it is the power consumption required state while the temperature of the FC stack 12 is below the predetermined temperature, the air-conditioning ECU 16 heats water by driving the heater 17 and performs the control for the air-conditioning hot-water circuit 18 and the cooling circuit 23 to operate in cooperation. Accordingly, the temperature of the FC stack 12, after regeneration, can be adjusted to be close to the predetermined temperature. Hence, when the FC stack 12 is resumed, sufficient power generation and motive power can be secured.

When it is the power consumption required state while the temperature of the FC stack 12 is higher than or equal to the predetermined temperature, the air-conditioning ECU 16 heats water by driving the heater 17 and performs a control to allow water to circulate in the air-conditioning hot-water circuit 18 and in the cooling circuit 23 independently. Consequently, the temperature of the FC stack 12 can be prevented from decreasing.

In the present embodiment, when it is the power consumption required state while the air-conditioning water temperature TW is higher than or equal to a first predetermined temperature and while the temperature of the FC stack 12 is below a second predetermined temperature, the air-conditioning ECU 16 heats a cooling medium by driving the heater 17. Further, the air-conditioning ECU 16 performs a control for the air-conditioning hot-water circuit 18 and the cooling circuit 23 to operate in cooperation. Accordingly, the temperature of the FC stack 12 after regeneration can be adjusted to be close to the second predetermined temperature while restricting an excessive increase of the air-conditioning water temperature TW. Hence, sufficient power generation and motive power can be secured when the FC stack 12 is resumed while restricting an excessive increase of the air-conditioning water temperature TW.

In the present embodiment, when it is the power consumption required state while the air-conditioning water temperature TW is higher than or equal to the first predetermined temperature and while the temperature of the FC stack 12 is higher than or equal to the second predetermined temperature, the air-conditioning ECU 16 controls the radiator 25 to release heat. More specifically, a flow rate of the cooling medium passing through the radiator 25 is controlled by the three-way valve 21 and the rotary valve 26 to lower a temperature of the cooling circuit 23 below the second predetermined temperature. When both of the air-conditioning water temperature TW and the temperature of the FC stack 12 are high, heat can be released from the radiator 25 while the air-conditioning hot-water circuit 18 and the cooling circuit 23 operate in cooperation. Accordingly, an excessive increase in temperature can be restricted for both of the air-conditioning water temperature TW and the temperature of the FC stack 12. Also, because the regenerative brake 14 can be operated continuously, actuation of the hydraulic brake can be restricted. Hence, a wear-induced damage of the hydraulic brake can be restricted.

The present disclosure is not limited to the above-mentioned embodiments, and may have various modifications as described below without departing from the gist of the present disclosure.

The scope of the present disclosure is not limited to the range exemplified with the structure of the embodiment. The range of the present disclosure is shown by the appended claims, and also includes all the changes in the equivalence.

In the embodiment above, the heater 17 uses an air-conditioning heater. However, a heater 17 provided for an exclusive use of the FC stack 12 may be driven. Also, a 12V low-voltage water heating heater may be used as the heater 17 by stepping down a voltage to 12 V using a DC-DC converter.

In the embodiment above, regenerated electric energy is stored in the form of heat energy in the cooling circuit 23. However, the present disclosure is not limited to the configuration to store heat energy in the cooling circuit 23. For example, the FC stack 12 may be replaced by a large-capacity hot-water heat-storing tank from the point of view of storing heat and maintaining regeneration.

In the embodiment above, the FC stack 12 is the heat emitting portion cooled by the cooling circuit 23 as a second circuit. However, the heat emitting portion is not limited to the FC stack 12. For example, the cooling circuit 23 may cool other heat emitting portion such as an engine of a hybrid vehicle.

In the embodiment above, only one heater is provided. However, the heater is not limited to one heater. Multiple heaters may be provided to the air-conditioning hot-water circuit 18 or another heater may be provided additionally to the cooling circuit 23.

What is claimed is:

1. An air-conditioner for a vehicle configured to blow air-conditioning air into an interior of the vehicle, the air-conditioner comprising:
    a first circuit in which a cooling medium circulates to cool a drive source of the vehicle;
    a heater heating the cooling medium circulating in the first circuit by consuming power in a storage device installed to the vehicle;
    a heating heat-exchanger disposed in the first circuit and heating the air-conditioning air passing through the heating heat-exchanger using the cooling medium by exchanging heat with the air-conditioning air passing through the heating heat-exchanger;
    a first pump disposed in the first circuit and forcing the cooling medium to circulate in the first circuit;
    a second circuit cooling a heat emitting portion installed to the vehicle, the cooling medium circulating in the first circuit is allowed to circulate in the second circuit;
    a second pump disposed in the second circuit and forcing the cooling medium to circulate in the second circuit;
    an adjustment portion connecting the first circuit and the second circuit and controlling a circulation amount of the cooling medium flowing in the first circuit and a circulation amount of the cooling medium flowing in the second circuit;
    a control portion controlling the heater, the adjustment portion, the first pump, and the second pump;
    a first temperature sensor detecting a temperature of the cooling medium circulating in the first circuit; and
    a second temperature sensor detecting a temperature of the cooling medium circulating in the second circuit, wherein:
    the vehicle includes a regenerative device recovering energy by converting kinetic energy to electric energy during deceleration of the vehicle;
    the storage device is charged with the electric energy recovered by the regenerative device;
    when the regenerative device is recovering the electric energy under a consumption required state in which it is determined that power in the storage device needs to be consumed by the air-conditioner, the control portion controls the heater, the adjustment portion, the first pump, and the second pump to heat the cooling medium by driving the heater such that the power in the storage device is converted into heat energy;
    when a temperature detected by the second temperature sensor is lower than a predetermined temperature under the consumption required state, the control portion heats the cooling medium by driving the heater and controls the adjustment portion, the first pump, and the second pump to force the cooling medium circulating in the first circuit to also circulate in the second circuit; and
    when the temperature detected by the second temperature sensor is higher than or equal to the predetermined temperature under the consumption required state, the control portion heats the cooling medium by driving the heater and controls the adjustment portion and the first pump to force the cooling medium to circulate in the first circuit while preventing the cooling medium from circulating in the second circuit from the first circuit.

2. The air-conditioner according to claim 1, wherein:
    when a temperature detected by the first temperature sensor is higher than or equal to a first predetermined temperature and when the temperature detected by the second temperature sensor is lower than a second predetermined temperature under the consumption required state, the control portion heats the cooling medium by driving the heater and controls the adjustment portion, the first pump, and the second pump to force the cooling medium circulating in the first circuit to also circulate in the second circuit.

3. The air-conditioner according to claim 1, further comprising:
    a radiation heat-exchanger disposed in the second circuit to release an amount of heat of the cooling medium passing through the radiation heat-exchanger to outside air, wherein:

the adjustment portion controls a flow rate of the cooling medium flowing to the radiation heat-exchanger; and when a temperature detected by the first temperature sensor is higher than or equal to a first predetermined temperature and when the temperature detected by the second temperature sensor is higher than or equal to a second predetermined temperature under the consumption required state, the control portion controls the adjustment portion to adjust a flow rate of the cooling medium passing through the radiation heat-exchanger such that the temperature of the second circuit becomes lower than the second predetermined temperature.

4. The air-conditioner according to claim 1, wherein:
the heat emitting portion cooled by the second circuit is a fuel cell.

* * * * *